United States Patent
Marumo et al.

(10) Patent No.: US 10,756,771 B2
(45) Date of Patent: Aug. 25, 2020

(54) WIRELESS SWITCH

(71) Applicant: OMRON Corporation, Kyoto (JP)

(72) Inventors: Katsuya Marumo, Otsu (JP); Yasushi Kawashima, Kusatsu (JP); Hajime Umeki, Kyoto (JP); Junji Obata, Osaka (JP); Keisuke Yano, Kusatsu (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/639,561

(22) PCT Filed: Dec. 20, 2018

(86) PCT No.: PCT/JP2018/046935
§ 371 (c)(1),
(2) Date: Feb. 14, 2020

(87) PCT Pub. No.: WO2019/135359
PCT Pub. Date: Jul. 11, 2019

(65) Prior Publication Data
US 2020/0228153 A1    Jul. 16, 2020

(30) Foreign Application Priority Data

Jan. 5, 2018   (JP) ................................. 2018-000391

(51) Int. Cl.
*H04B 1/16* (2006.01)
*G06F 1/26* (2006.01)
*H04B 1/04* (2006.01)

(52) U.S. Cl.
CPC ............. *H04B 1/1615* (2013.01); *G06F 1/26* (2013.01); *H04B 1/04* (2013.01)

(58) Field of Classification Search
CPC ........... H04B 1/1615; H04B 1/04; G06F 1/26; H04N 5/38
(Continued)

(56) References Cited

U.S. PATENT DOCUMENTS 9,419,496 B2 *   8/2016   Tsukanaka ............... G05G 5/05
10,304,639 B2 *  5/2019   Marumo ................. G08C 17/02
(Continued)

FOREIGN PATENT DOCUMENTS

| JP | S59193032  | 12/1984 |
| JP | 2006237911 | 9/2006  |
| WO | 2015037286 | 3/2015  |

OTHER PUBLICATIONS

"International Search Report (Form PCT/ISA/210) of PCT/JP2018/046935," dated Jan. 22, 2019, with English translation thereof, pp. 1-2.
(Continued)

*Primary Examiner* — Sonny Trinh
(74) *Attorney, Agent, or Firm* — JCIPRNET

(57) ABSTRACT

A wireless switch comprising: a movable section provided to be freely displaceable; an operation unit elastically held by the movable section and, when in a non-neutral state, vibrating as a result of an action of elastic force that causes return to a neutral state and displacing the movable section in a direction corresponding to a direction of the vibration; a power generation unit generating a voltage of a polarity corresponding to a direction of displacement when the movable section has been displaced; a wireless transmission unit wirelessly transmitting a signal on the basis of power generated by the power generation unit; and a voltage supply control circuit, when the operation unit in the neutral state has been operated such that the operation unit is brought into a non-neutral state, supplying a voltage to the wireless transmission unit using power generated by the power generation unit at a time of an initial state change of the operation unit and then disabling voltage supply to the wireless transmission unit by the power generated by the power generation unit accompanying the vibration of the
(Continued)

operation unit caused by the action of the elasticity afterward.

3 Claims, 9 Drawing Sheets

(58) Field of Classification Search
USPC ........................................................ 455/343.1
See application file for complete search history.

(56) References Cited

U.S. PATENT DOCUMENTS

| | | | |
|---|---|---|---|
| 10,312,833 B2* | 6/2019 | Furukawa | H02K 1/34 |
| 2002/0074898 A1* | 6/2002 | Maue | B60R 25/24 |
| | | | 310/311 |
| 2012/0199454 A1* | 8/2012 | Guillot | H01H 9/168 |
| | | | 200/302.1 |
| 2012/0212071 A1* | 8/2012 | Miyabayashi | H02J 50/90 |
| | | | 307/104 |
| 2014/0132090 A1* | 5/2014 | Takahashi | H02K 35/00 |
| | | | 310/15 |
| 2015/0155472 A1* | 6/2015 | Furukawa | H02N 2/18 |
| | | | 310/26 |

OTHER PUBLICATIONS

"Written Opinion of the International Searching Authority (Form PCT/ISA/237) of PCT/JP2018/046935," dated Jan. 22, 2019, with English translation thereof, pp. 1-6.

* cited by examiner

WIRELESS SWITCH

CROSS-REFERENCE TO RELATED APPLICATION

This application is a 371 application of the International PCT application serial no. PCT/JP2018/046935, filed on Dec. 20, 2018, which claims the priority benefit of Japan Patent Application No. 2018-000391, filed on Jan. 5, 2018. The entirety of each of the above-mentioned patent applications is hereby incorporated by reference herein and made a part of this specification.

TECHNICAL FIELD

The present invention relates to a wireless switch that wirelessly transmits a signal in accordance with an operation performed by an operator or contact of a member.

BACKGROUND ART

Patent Literature 1 (Japanese Patent Application Laid-Open No. 2006-237911) discloses an operation information wireless transmitting device that does not require a power supply such as a battery by including a DC generator that generates power using a motion of a movable member generated by a movement of a user and a wireless transmitter that operates with power generated by the DC generator.

SUMMARY

In the related art, for example, a switch operated by an operator while performing predetermined work on a moving product and a limit switch that switches a state using contact of a moving member have been used.

Such a switch has, for example, a rod-like operation unit elastically held so as to tilt so that the operation unit can be operated while work is performed. An operator operates the switch by performing tilting, hitting, and tapping operations on the operation unit.

However, so-called telegraphing may occur in the switch for operating such an elastically held operation unit. This is a phenomenon that, after an operation unit enters a displaced state from a neutral state, the operation unit enters another displaced state at an operation point on the opposite side of the neutral state due to recoil occurring when the operation unit returns to the neutral state from the aforementioned displaced state, or the operation unit repeatedly makes a motion, and accordingly the switch is operated multiple times.

The recoil occurs according to a balance between inertia and elastic holding of the operation unit. Telegraphing may also occur in a limit switch if it makes such a large recoil.

In particular, when a signal is wirelessly transmitted in accordance with an operation of a switch, power may be generated multiple times due to one switch operation caused by telegraphing, and thereby unintended data may be transmitted. In addition, it is desirable for an amount of data to be transmitted to be small from the viewpoint of a collision of data that occurs when signals are wirelessly transmitted from a plurality of switches.

Therefore, an objective of the present invention is to provide a wireless switch that can avoid a plurality of wireless transmission operations being caused by telegraphing.

A wireless switch as an example of the present disclosure comprises a movable section provided to be freely displaceable; an operation unit that is elastically held by the movable section and, when in a non-neutral state, vibrates as a result of an action of an elastic force that causes return to a neutral state and displaces the movable section in a direction corresponding to a direction of the vibration; a power generation unit that generates a voltage of a polarity corresponding to a direction of displacement when the movable section has been displaced, a wireless transmission unit that wirelessly transmits a signal based on the a power generated by the power generation unit, and a voltage supply control circuit that, when the operation unit in the neutral state has been operated such that the operation unit is brought into the non-neutral state, supplies a voltage to the wireless transmission unit using the power generated by the power generation unit at a time of an initial state change of the operation unit and then disables voltage supply to the wireless transmission unit by the power generated by the power generation unit accompanying the vibration of the operation unit caused by the action of the elastic force afterward.

According to this configuration, since a voltage (electric power) generated by the power generation unit accompanying vibration of the operation unit after the operation unit in the neutral state is operated such that the operation unit is brought into the non-neutral state is not supplied to the wireless transmission unit, unnecessary wireless transmission caused by telegraphing can be avoided.

In addition, in an example of the present disclosure, the voltage supply control circuit comprises voltage supply lines for supplying the voltage from the power generation unit to the wireless transmission unit, a switch element that is shunt-connected to the voltage supply lines and blocks the voltage supply to the wireless transmission unit using conduction, and a switch element control circuit that is charged with a voltage of a polarity opposite to the polarity of the voltage generated by the power generation unit and to be supplied to the wireless transmission unit and causes the switch element to conduct electricity.

With this configuration, energy of the power generated by the power generation unit accompanying vibration of the operation unit is effectively used for disabling the voltage supply to the wireless transmission unit. In other words, as a width of vibration of the operation unit becomes larger, not only a voltage of a polarity (voltage of a first polarity) to be supplied to the wireless transmission unit but also a voltage of the opposite polarity (voltage of a second polarity) of the power generation unit increases. Therefore, unnecessary wireless transmission can be avoided even when a vibration width of the operation unit is large.

In addition, in an example of the present disclosure, the switch element control circuit is a circuit which is connected between the voltage supply lines with a diode that prevents backflow of the voltage of the first polarity to be supplied to the wireless transmission unit and a capacitor connected in series and in which a voltage at a connection point of the diode and the capacitor is output to the switch element as a control signal.

With this configuration, a voltage supply control circuit is configured with a small number of circuit elements at low cost.

According to the present invention, a wireless switch that can avoid a plurality of wireless transmission operations being caused by telegraphing can be obtained.

Figure 2:
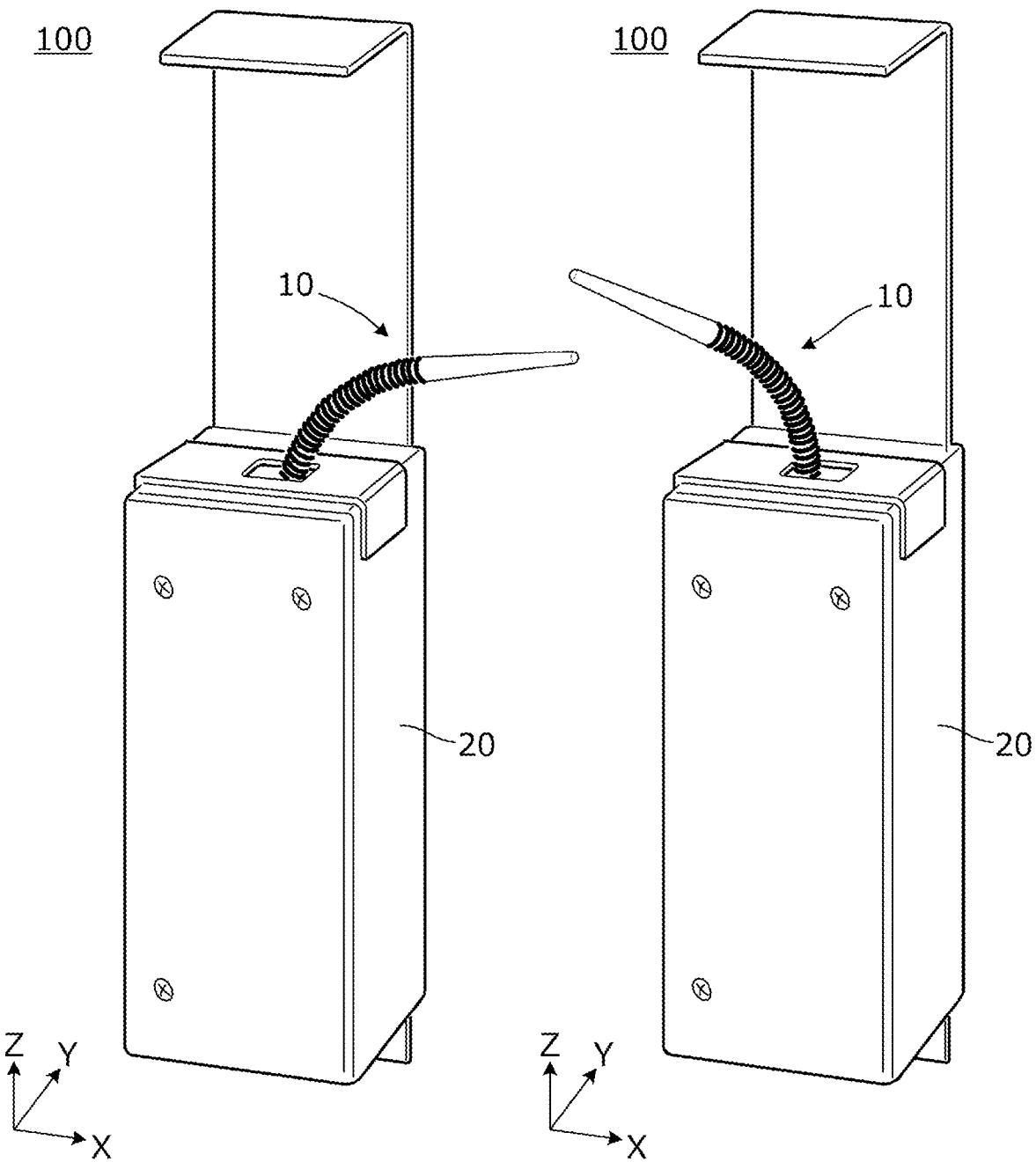

(A) of FIG. 2 illustrates a state of an operation unit 10 tilting to the right, and (B) of FIG. 2 illustrates a state of the operation unit 10 returning to a neutral state from the state illustrated in (A) of FIG. 2 and then further tilting to the left due to recoil.

Figure 3:
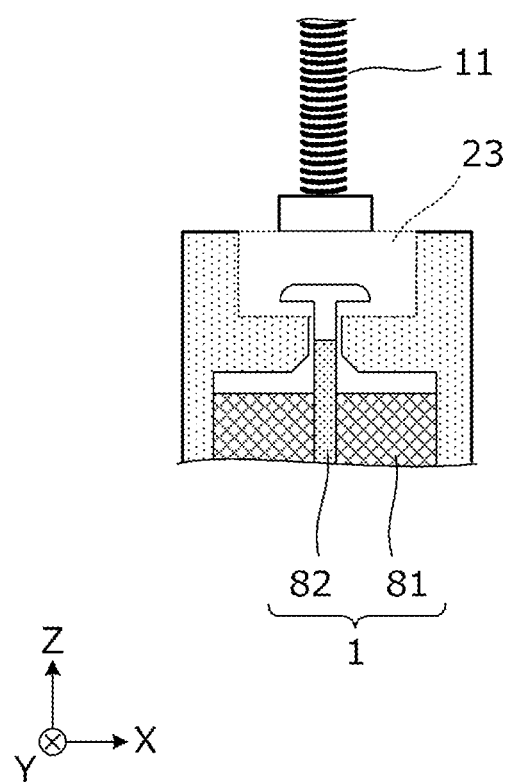

FIG. 3 is a diagram illustrating a relation between a movable section and a power generation unit provided inside a housing of a wireless switch 100.

Figure 4:
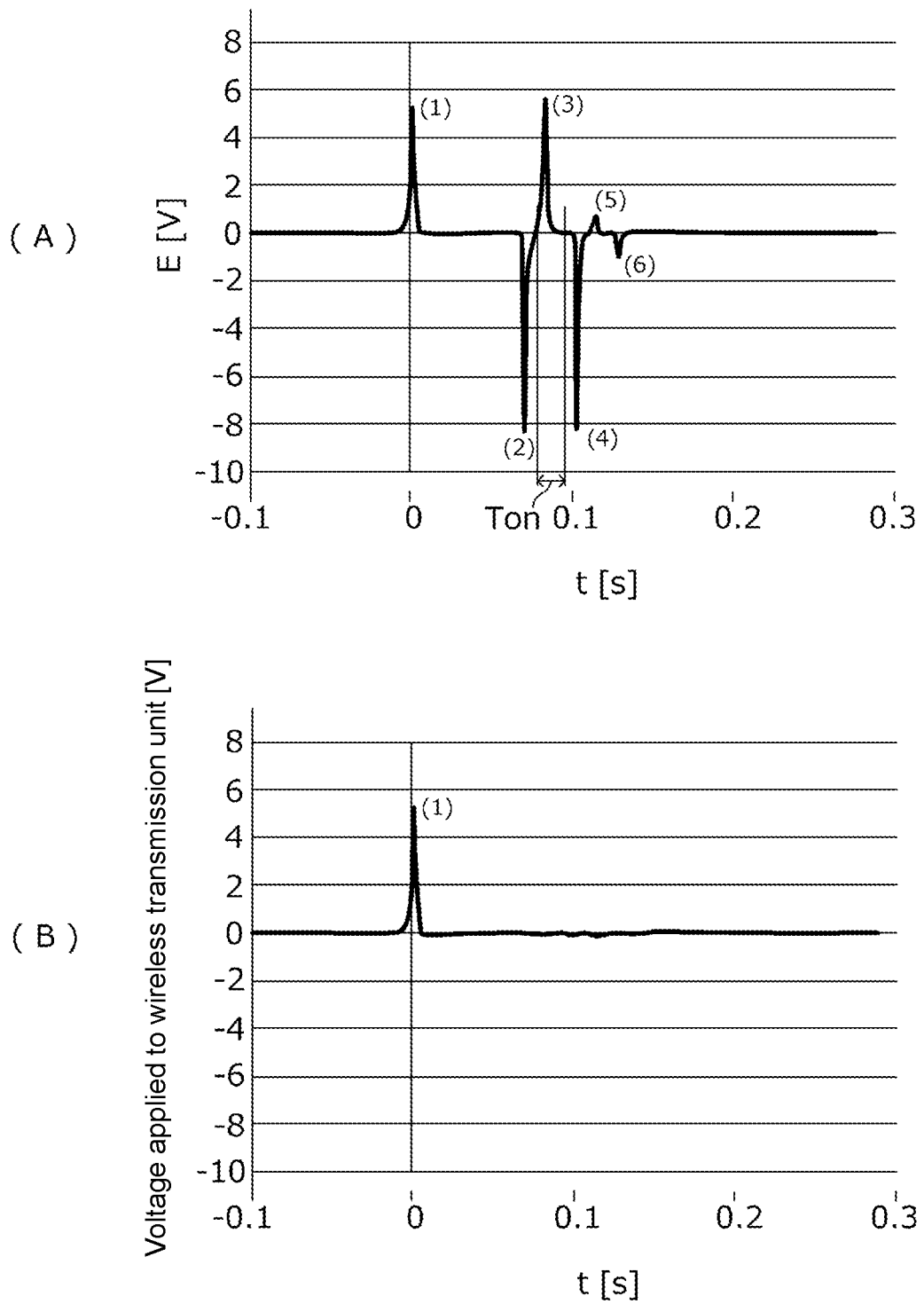

(A) of FIG. 4 is a waveform diagram as an example of a voltage generated due to an operation of the operation unit 10 of the wireless switch 100. (B) of FIG. 4 is a waveform diagram of a power supply voltage applied to a wireless transmission unit.

Figure 5:
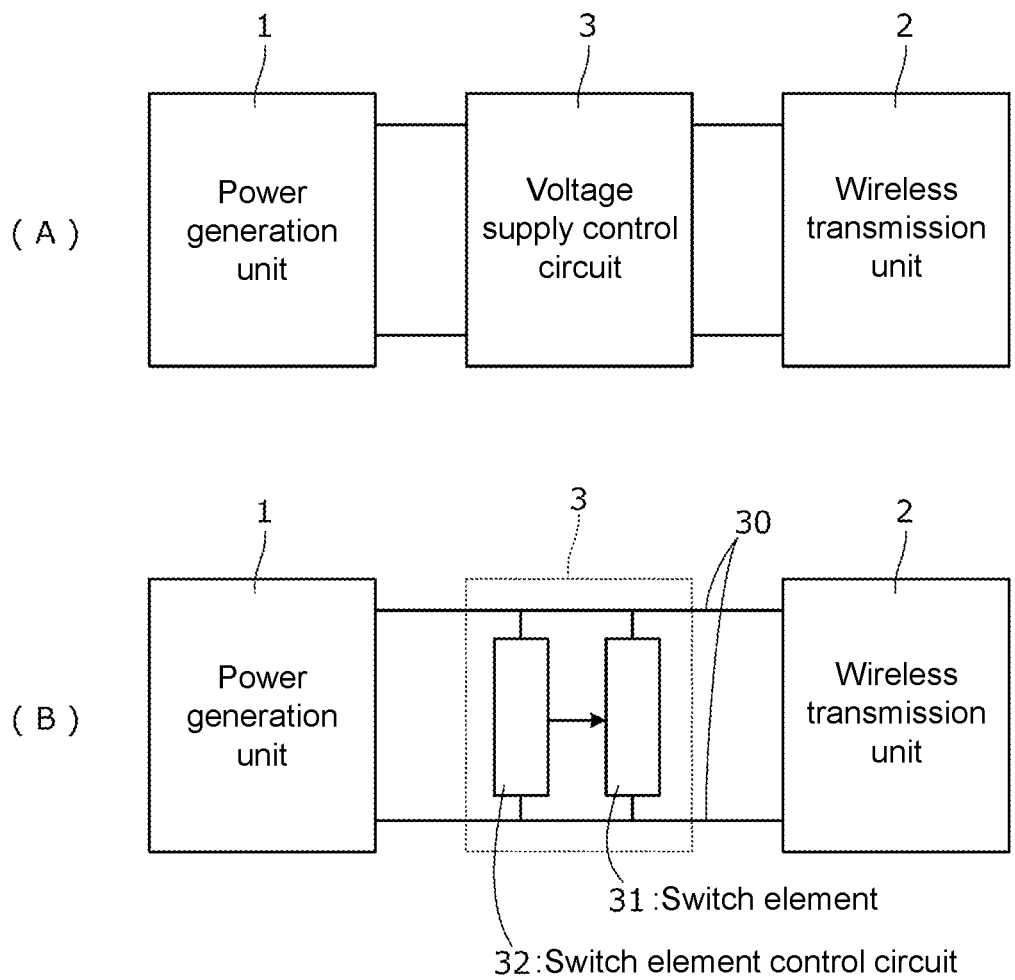

FIG. 5 is diagrams of which (A) and (B) illustrate configurations of a voltage supply control circuit of the wireless switch according to the present embodiment.

Figure 6:
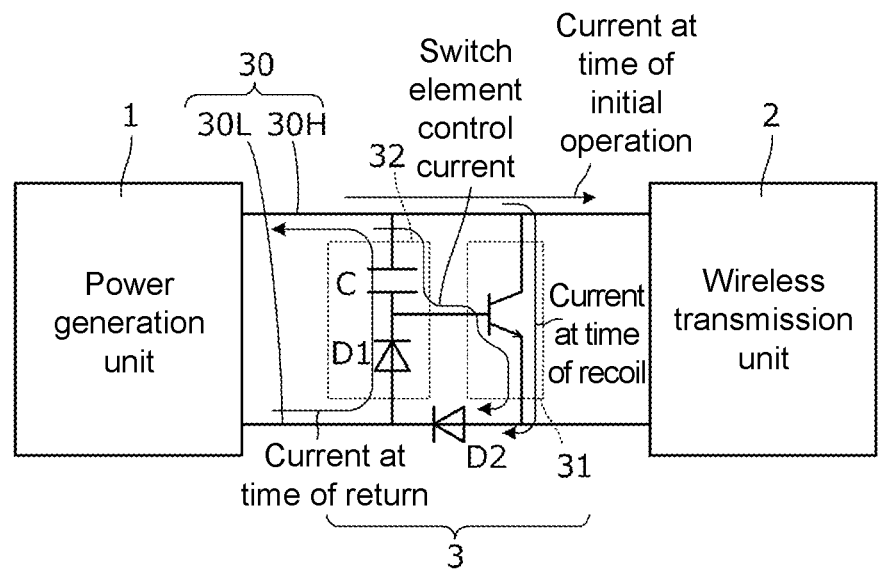

FIG. 6 is a circuit diagram illustrating a more specific configuration example of the voltage supply control circuit 3.

Figure 7:
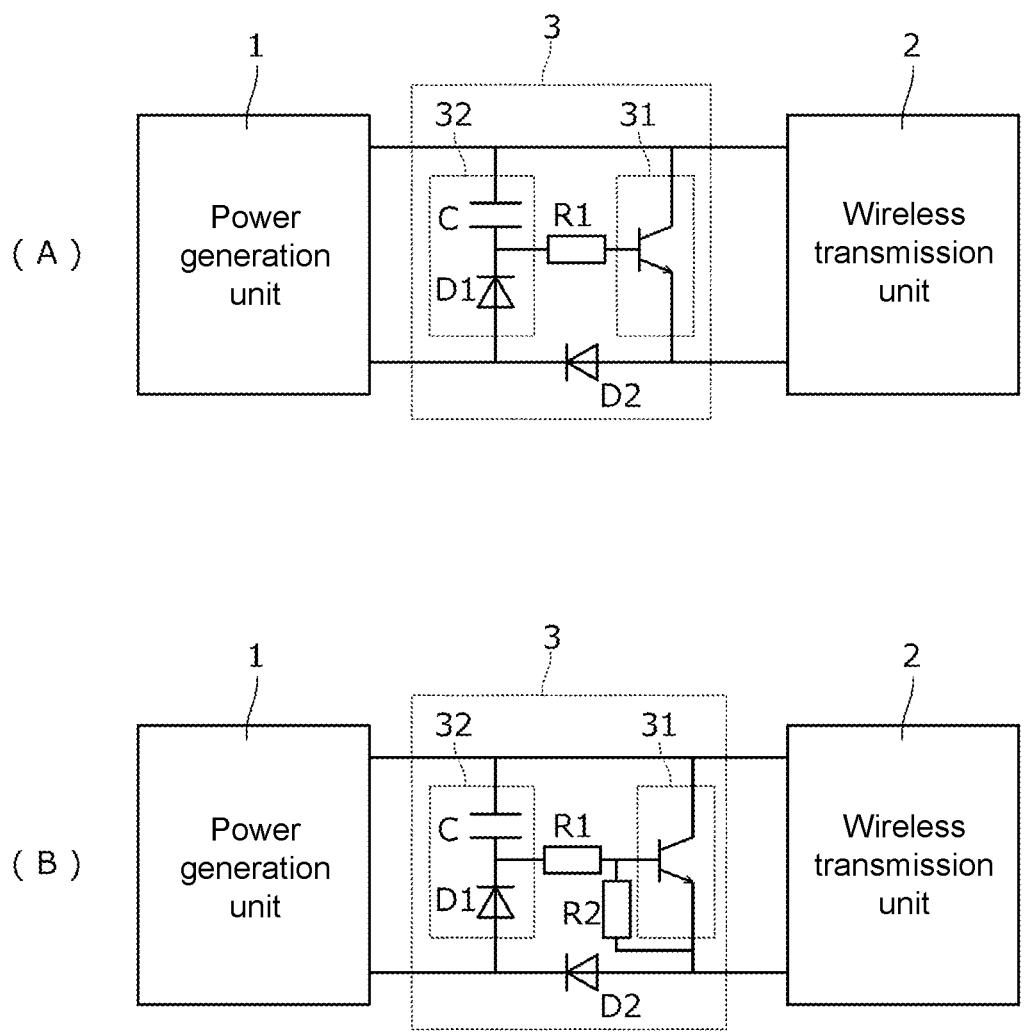

FIG. 7 is diagrams of which (A) and (B) illustrate other configuration examples of the voltage supply control circuit 3 illustrated in FIG. 6.

Figure 8:
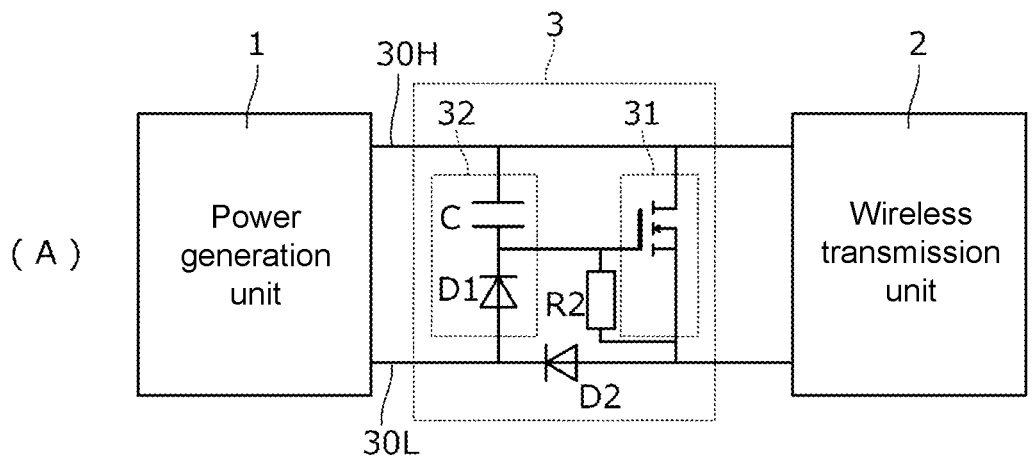
Figure 8:
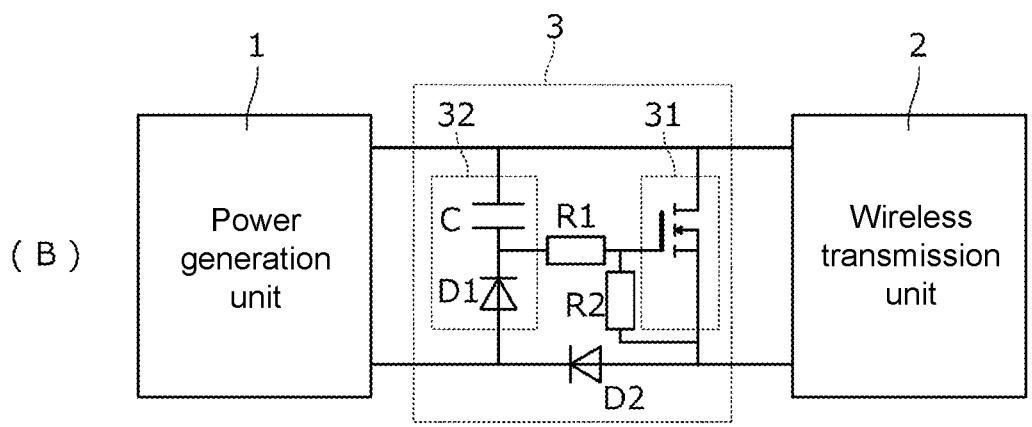

FIG. 8 is diagrams of which (A) and (B) illustrate examples in which a MOS-FET is used as a switch element 31.

Figure 9:
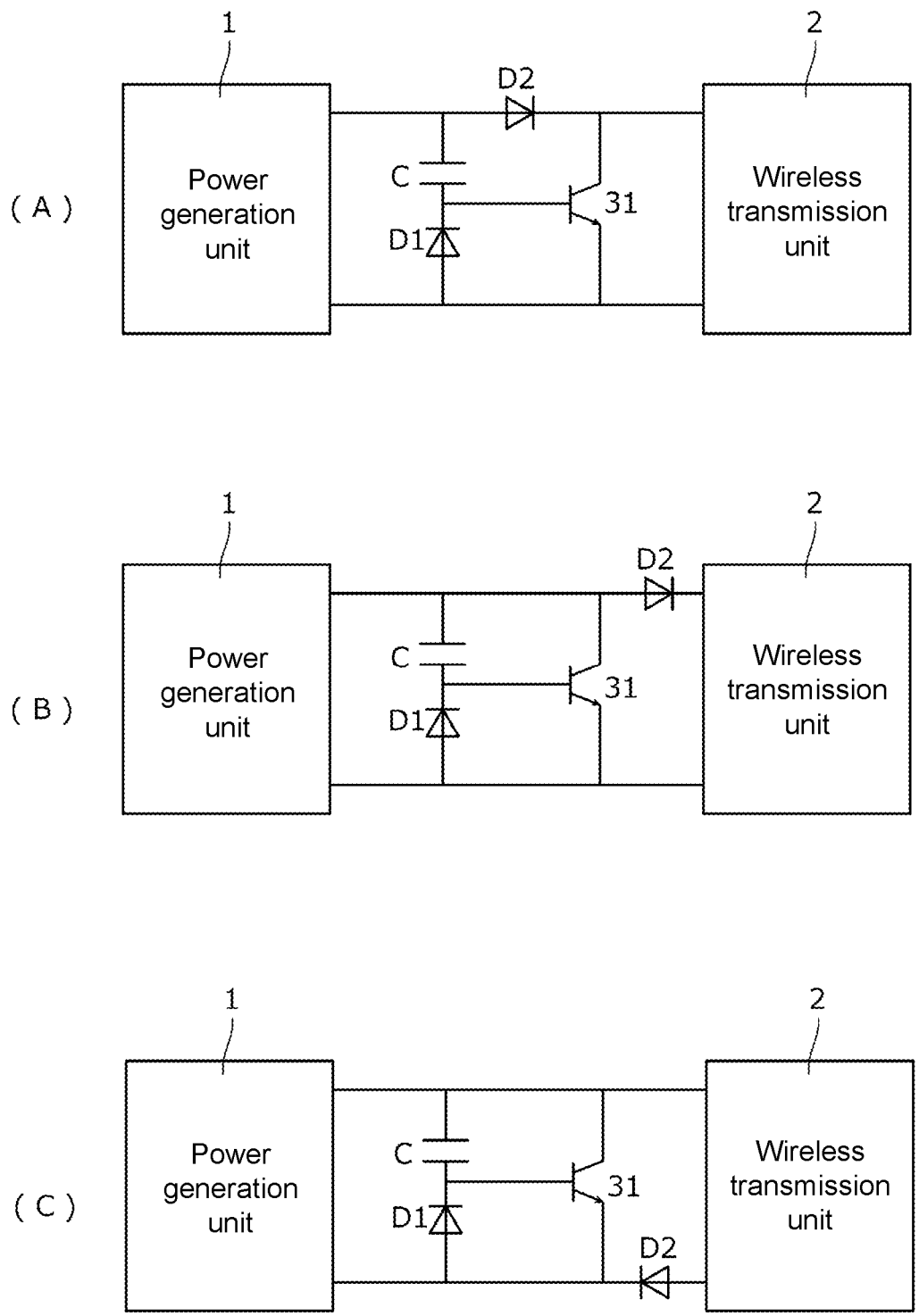

FIG. 9 is diagrams of which (A), (B) and (C) illustrate examples of several connection positions of a diode D2 between a power generation unit 1 and a wireless transmission unit 2.

Figure 10:
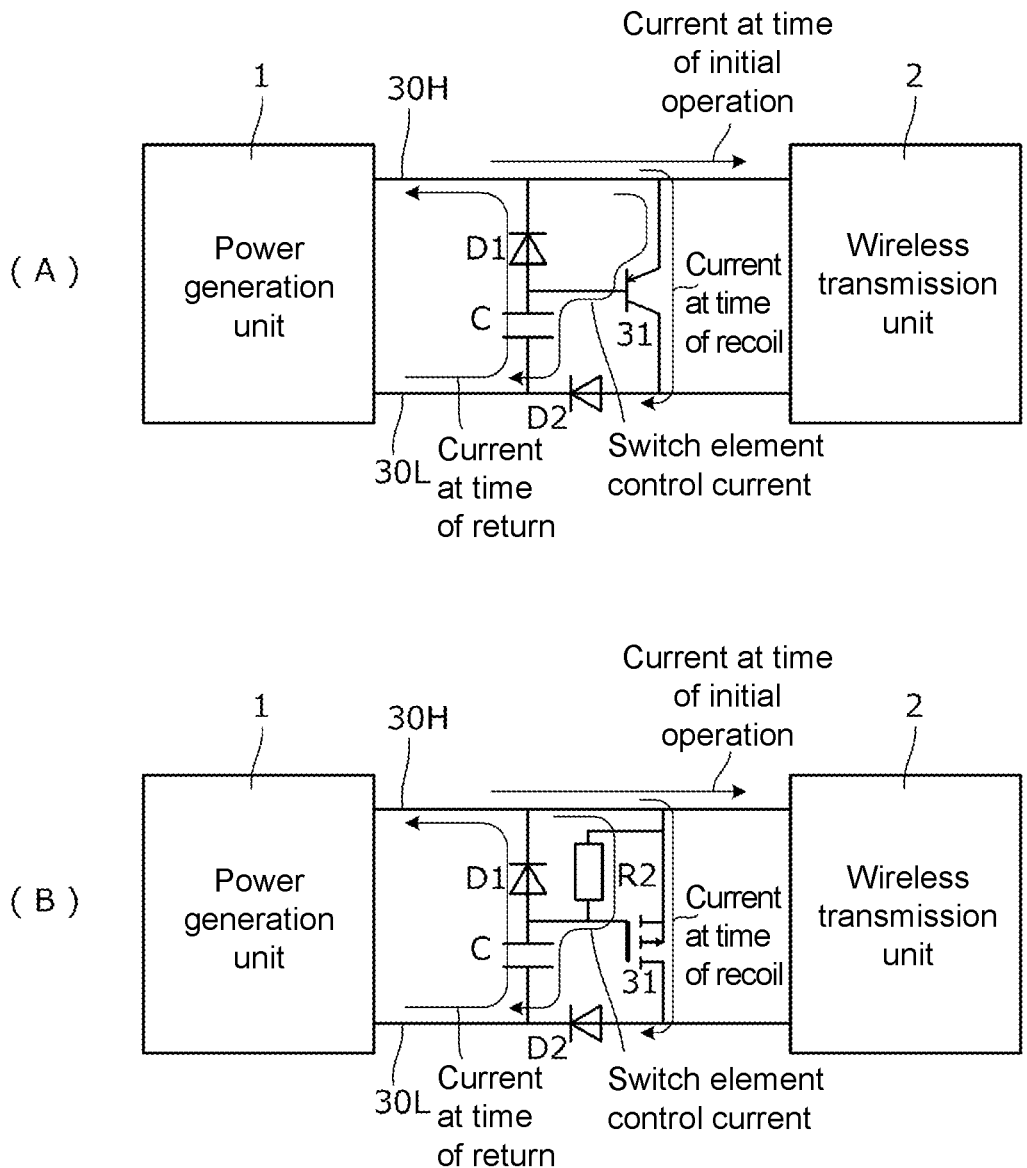

FIG. 10 is diagrams of which (A) and (B) illustrate examples in which a switch element different in type from the switch element 31 illustrated in FIGS. 8(A) and 8(B) is used.

DESCRIPTION OF EMBODIMENTS

An embodiment for implementing the present invention will be described below with reference to several diagrams.

Application Example

Figure 1:
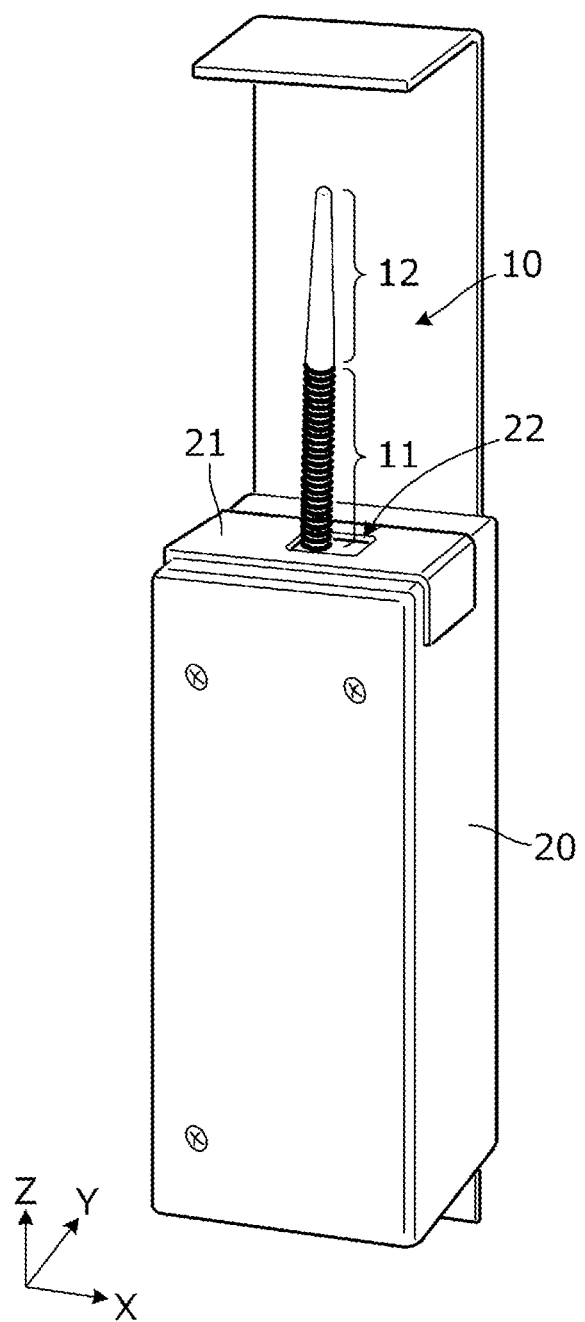
FIG. 1 is a diagram illustrating an external appearance of a wireless switch according to an embodiment of the present invention.

First, an example to which the present invention is applied will be described with reference to FIG. 1. FIG. 1 is a diagram illustrating an external appearance of a wireless switch 100 according to an embodiment of the present invention. Note that, in FIG. 1, the direction in the X axis when the wireless switch 100 is viewed in the Y axis direction is assumed to be the right and the direction opposite to the right is assumed to be the left.

The wireless switch 100 according to the present embodiment includes a housing 20 and an operation unit 100 elastically held by a movable section inside the housing 20.

The operation unit 10 is in a neutral state in FIG. 1. (A) of FIG. 2 illustrates a state of the operation unit 10 tilting to the right, and (B) of FIG. 2 illustrates a state of the operation unit 10 attempting to return to the neutral state from the state illustrated in (A) of FIG. 2 and then further tilting to the left due to recoil. As described above, due to the recoil occurring at the time of return from a displaced state to the neutral state, the operation unit 10 can be in another displaced state in the opposite direction from the neutral state. Further, without being limited to the opposite direction, the operation unit can be displaced in a guided direction in a case where any guidance structure is provided.

The wireless switch 100 includes a power generation unit that generates a voltage of a first polarity in accordance with displacement of the movable section due to an operation of the operation unit 10 and generates a voltage of a second polarity in accordance with displacement of the movable section at the time of return, and a wireless transmission unit that wirelessly transmits a signal based on the power generated by the power generation unit. The signal is, for example, a signal indicating a state of the switch.

Further, in this example, the direction in which the operation unit 10 vibrates to the neutral state side from the state in which the operation unit 10 tilts to the right will be referred to as a return, and the direction in which the operation unit 10 vibrates to the neutral state side from the state in which the operation unit 10 tilts to the left will be referred to as recoil.

The wireless switch 100 further includes a voltage supply control circuit that supplies a voltage to the wireless transmission unit with power generated by the power generation unit at the time of an initial displacement of the movable section caused by an operation of the operation unit 10 and disables the supply of voltage to the wireless transmission unit with power generated by the power generation unit at the time of displacement of the movable section caused by recoil.

Thus, unnecessary wireless transmission can be avoided due to the voltage (electric power) generated when the operation unit 10 recoils.

Configuration Example

Next, a configuration of the wireless switch 100 according to an embodiment of the present invention will be described below with reference to drawings. FIG. 1 is a diagram illustrating the external appearance of the wireless switch 100 according to the embodiment of the present invention as described above. The operation unit 10 has a base formed as a coil spring part 11 and a tip formed as a rod part 12. The operation unit 10 is elastically held by the movable section provided inside the housing 20. A stopper plate 21 is provided at a part of the housing 20. An opening 22 into which the operation unit 10 is inserted is formed in the stopper plate 21. Due to the opening 22, the operation unit 10 tilts mainly in the direction along the X axis direction (to the right) and is less likely to tilt in the direction opposite thereto (to the left). However, since the coil spring part 11 bends when the operation unit 10 recoils as illustrated in (B) of FIG. 2, the movable section inside the housing may be displaced to the left.

FIG. 3 is a diagram illustrating a relation between the movable section and the power generation unit provided inside the housing of the wireless switch 100. A root part of the coil spring part 11 of the operation unit 10 is attached to the movable section 23. The movable section 23 is an actuator that dynamically converts displacement of the coil spring part 11 in a tilt direction into displacement in a direction along the Z axis direction. The power generation unit 1 is provided below the movable section 23. The power generation unit 1 includes a power generation section 81 and a power generation shaft 82. When the power generation shaft 82 is displaced in an axial direction (a direction along the Z axis direction), power is generated due to electromagnetic induction. The power generation shaft 82 is, for example, a magnet, and an induction coil is provided in the power generation section 81.

When the coil spring part 11 of the operation unit 10 tilts from the neutral state, the power generation shaft 82 is displaced downward again, and the power generation unit 1 generates a voltage of the first polarity. Then, when the coil spring part 11 of the operation unit 10 returns to the neutral state, the power generation shaft 82 is displaced upward, and the power generation unit 1 generates a voltage of the second polarity. Furthermore, when the power generation shaft 82 is displaced downward due to recoil of the operation unit 10 thereafter, the power generation unit 1 generates a voltage of the first polarity again. A relation between tilting of the operation unit 10 and a direction of displacement of the power generation shaft may be the opposite to one described above.

(A) of FIG. 4 is a waveform diagram as an example of a voltage generated due to an operation of the operation unit 10 of the wireless switch 100. The horizontal axis represents elapsed time, and the vertical axis represents voltage generated by the power generation unit. In this example, power generation takes place as indicated by (1), (2), (3), (4), (5), and (6).

In (A) of FIG. 4, if the operation unit 10 is operated (is tilted) at a time 0 s, a positive voltage (a voltage of the first polarity) is generated as indicated by (1). The operation unit 10 vibrates due to the elastic force of the coil spring part 11 when the operator takes off his or her finger therefrom as described below. However, in (A) of FIG. 4, a time at which the generated voltage reaches the peak is indicated as a power generation time. Then, when the operation unit 10 returns at a time after about 0.07 seconds have elapsed (when the operator takes his or her finger off from the operation unit 10), a negative voltage (a voltage of the second polarity) is generated as indicated by (2). Then, a positive voltage is generated due to recoil of the operation unit 10 at a time after about 0.09 seconds have elapsed as indicated by (3). Further, a negative voltage is generated due to return from the recoil at a time after about 0.1 seconds have elapsed as indicated by (4). Then, a positive voltage is generated due to recoil of the operation unit 10 at a time after about 0.11 seconds have elapsed as indicated by (5). Then, a negative voltage is generated due to return from the recoil at a time after about 0.12 seconds have elapsed as indicated by (6).

The amounts of power generated indicated by (1), (2), (3), (4), (5), and (6) described above are, for example, as follows.

(1) 272 µJ
(2) 490 µJ
(3) 341 µJ
(4) 477 µJ
(5) 4 µJ
(6) 6 µJ

While the speed at which the operation unit 10 is tilted in an initial operation of the operation unit 10 is relatively low, the return speed thereof is due to a spring force and is high as shown above, and thus the amount of power generation at the time of return is the maximum.

(B) of FIG. 4 is a waveform diagram of a power supply voltage applied to the wireless transmission unit which will be introduced below. As will be described in detail below, in the present embodiment, control is performed such that wireless transmission is performed at the power generation of (1) and no wireless transmission is performed at the power generation of (3) and (5).

According to the present embodiment, as an amount of recoil of the operation unit 10 becomes larger, an amount of power generation at the time of return becomes larger, and thus even when a significant recoil occurs, a voltage generated at the time of displacement caused by the recoil can be reliably disabled. As described above, power generation energy of the power generation unit at the time of return is effectively used for disabling a voltage generated at the time of displacement caused by recoil.

FIG. 5 is diagrams of which (A) and (B) illustrate configurations of the voltage supply control circuit of the wireless switch according to the present embodiment.

The wireless switch of the present embodiment includes the power generation unit 1, the wireless transmission unit 2, and the voltage supply control circuit 3. Actions of the power generation unit 1 are as described above. The wireless transmission unit 2 wirelessly transmits a signal using a voltage (electric power) generated by the power generation unit 1 as a power source. The voltage supply control circuit 3 supplies a voltage to the wireless transmission unit 2 with power generated by the power generation unit 1 when the movable section 23 (see FIG. 3) is displaced for the first time due to an operation of the operation unit 10 and disables the supply of voltage to the wireless transmission unit with power generated by the power generation unit 1 when the movable section 23 is displaced due to recoil.

FIG. 5 is a diagram illustrating a configuration example of an inside of the voltage supply control circuit 3. The voltage supply control circuit 3 is constituted by a voltage supply line 30 for supplying a voltage from the power generation unit 1 to the wireless transmission unit 2, a switch element 31 shunt-connected to the voltage supply line 30, and a switch element control circuit 32 controlling the switch element 31.

The switch element control circuit 32 causes the power generation unit 1 to be charged with a voltage generated at the time of return and the switch element 31 to conduct electricity. When the switch element 31 conducts electricity, a voltage of the voltage supply line 30 is substantially 0 V, and thus the supply of voltage to the wireless transmission unit is blocked.

Due to the above-described action of the switch element control circuit 32, a power supply voltage is supplied to the wireless transmission unit at the power generation of (1) and thus wireless transmission is performed, and no wireless transmission is performed at the power generation of (3) and (5) as illustrated in (A) of FIG. 4.

FIG. 6 is a circuit diagram illustrating a more specific configuration example of the voltage supply control circuit 3. The voltage supply line connected from the power generation unit 1 to the wireless transmission unit 2 includes two lines 30H and 30L in FIG. 6. If the voltage supply line 30L is set as a reference when the power generation unit 1 generates a voltage of the first polarity, a positive voltage is output to the voltage supply line 30H. In addition, if the voltage supply line 30L is set as a reference when the power generation unit 1 generates a voltage of the second polarity, a negative voltage is output to the voltage supply line 30H.

The switch element control circuit 32 is a circuit which is connected between the voltage supply lines 30H and 30L with a backflow prevention diode D1 and a capacitor C connected in series and in which a voltage at a connection point of the diode D1 and the capacitor C is output to the switch element 31 as a control signal. The switch element 31 is an NPN-type bipolar transistor in this example, and a collector/emitter thereof is connected between the voltage supply lines 30H and 30L. In addition, the connection point of the diode D1 and the capacitor C is connected to a base of the transistor. In addition, in the example illustrated in FIG. 6, a diode D2 is connected to the voltage supply line connected between the power generation unit 1 and the wireless transmission unit 2.

An operation of the voltage supply control circuit 3 illustrated in FIG. 6 is as follows.

(a) When the power generation unit generates a voltage of the first polarity due to an initial operation of the operation unit 10, the switch element 31 does not conduct electricity, and the voltage of the first polarity is supplied to the wireless transmission unit 2.

(b) Then, when the power generation unit 1 generates a voltage of the second polarity due to return of the operation unit 10, a current (a return-time current) flows in the series circuit of the diode D1 and the capacitor C in the direction from the voltage supply line 30L to the voltage supply line 30H. Due to this current, the capacitor C is charged with a positive polarity on the cathode side of the diode D1 and a negative polarity on the voltage supply line 30H side.

(c) Then, when the power generation unit 1 generates a voltage of the first polarity due to recoil of the operation unit 1, a switch element control current flows through the path of the power generation unit 1→the voltage supply line 30H→the capacitor C→the base and emitter of the transistor→the diode D2→the voltage supply line 30L→the power generation unit 1. Since the current flows, the capacitor C is discharged. The current is a control signal for the switch element 31. Thus, the switch element 31 conducts electricity, and the path between the voltage supply lines 30H and 30L is shunted. Due to the above operation, a power supply voltage to the wireless transmission unit 2 becomes substantially 0 V. Therefore, no wireless transmission from the wireless transmission unit 2 occurs. A discharge time of the capacitor C may be equal to or longer than a generation time of a voltage of the first polarity. A time Ton shown in (A) of FIG. 4 indicates the time. Ton is, for example, a time longer than or equal to several dozen ms and equal to or shorter than several hundred ms.

(d) Then, when the power generation unit 1 generates a voltage of the second polarity due to return from the recoil of the operation unit 10, a return-time current flows as in the operation of (b) described above. Due to this current, the capacitor C is charged with a positive polarity on the cathode side of the diode D1 and a negative polarity on the voltage supply line 30H side.

(e) Then, when the power generation unit 1 generates a voltage of the first polarity due to recoil of the operation unit 10 again, the capacitor C is discharged, the switch element 31 conducts electricity, and the path between the voltage supply lines 30H and 30L is shunted, similarly to the operation of (c) described above. Due to the above operation, a power supply voltage to the wireless transmission unit 2 becomes substantially 0 V. Therefore, no wireless transmission from the wireless transmission unit 2 occurs.

Even if telegraphing further continues, the series of the above-described operations are repeated, and after all, wireless transmission from the wireless transmission unit 2 occurs only at the time of the initial operation of the operation unit 10.

In the operation of (a) described above (the initial operation), the transistor does not substantially conduct electricity even if a current flows through a current path of the voltage supply line 30H→the capacitor C→the base and emitter of the transistor. At the time of the initial operation, the capacitor C has not been charged yet. That is, since the cathode side of the diode D1 is not charged with the positive polarity, a base potential with respect to the emitter of the transistor has a voltage lower than a threshold voltage between the base and the emitter of the transistor, and the transistor does not conduct electricity. In other words, the threshold voltage between the base and the emitter of the transistor and a capacitance of the capacitor C may be determined so that the transistor does not substantially conduct electricity at the time of the initial operation of the operation unit 10.

Further, even if a current flows through the above-described current path at the time of the initial operation and thus the transistor conducts electricity momentarily, it is not a problem. That is, if a base current decreases and the transistor is blocked in accordance with a current flowing through the current path and the capacitor C is charged in the opposite direction (the capacitor C is charged with the positive polarity on the voltage supply line 30H side), a power supply voltage to the wireless transmission unit 2 is immediately restored.

Therefore, there is no problem as long as a conduction time of the transistor at the time of the initial operation is sufficiently short.

In FIG. 6, the diode D2 acts such that, when the power generation unit 1 generates a voltage of the second polarity, a voltage of the opposite polarity is not applied to the wireless transmission unit 2. However, since the return-time current flows when the power generation unit 1 generates a voltage of the second polarity, a peak voltage of the opposite polarity to the wireless transmission unit 2 is suppressed. Therefore, the diode D2 may be omitted.

Since a voltage (electric power) generated by the power generation unit when the operation unit returns and when the operation unit is displaced due to recoil is not supplied to the wireless transmission unit as described above, unnecessary wireless transmission caused by telegraphing can be avoided. In addition, a time delay and a complicated configuration of a control unit required for data processing can also be avoided in contrast to a case in which a radio wave transmitted from a wireless switch is received and data of telegraphing is removed through data processing.

According to the present embodiment, since the voltage supply control circuit 3 is configured with a small number of circuit elements as illustrated in FIG. 6, a wireless switch can be configured at low cost.

FIG. 7 is diagrams of which (A) and (B) illustrate other configuration examples of the voltage supply control circuit 3 illustrated in FIG. 6. In the example illustrated in (A) of FIG. 7, a resistive element R1 is inserted between the connection point of the diode D1 and the capacitor C and the base of the transistor. In addition, in the example illustrated in (B) of FIG. 7, the resistive element R1 is inserted between the connection point of the diode D1 and the capacitor C and the base of the transistor, and a resistive element R2 is connected between the base and the emitter of the transistor. The configurations of the examples are otherwise the same as those illustrated in FIG. 6.

As described above, a resistive element or a resistive circuit may be provided between the switch element control circuit 32 and the switch element 31. A discharge-time constant of the capacitor C is substantially determined from a resistance value of the resistive element R1 and a capacitance of the capacitor C. That is, since a conduction time of the switch element 31 is determined in accordance with the discharge-time constant, a conduction time of the switch element 31 may be appropriately determined from the capacitance of the capacitor C and the resistance value of the resistive element R1. The conduction time of the switch element 31 is preferably set to be longer than a duration of the voltage of the first polarity after the second time shown in (A) of FIG. 4. The time Ton shown in (A) of FIG. 4 is the conduction time of the switch element 31 as described above. With this configuration, an operation (erroneous operation) of the wireless transmission unit 2 caused by the voltage of the first polarity can be reliably prevented.

In addition, particularly in the example illustrated in (B) of FIG. 7, since a divided voltage of the resistive elements R1 and R2 is applied between the base and the emitter of the transistor, the voltage applied between the base and the emitter of the transistor at the time of the initial operation of the operation unit 10 described above can be easily set to be lower than a threshold voltage.

FIG. 8 is diagrams of which (A) and (B) illustrate examples in which a MOS-FET is used as a switch element 31. In these examples, the switch element is an N-channel MOS-FET, the drain is connected to the voltage supply line 30H, the source is connected to the voltage supply line 30L, and the connection point of the diode D1 and the capacitor C is connected to the gate.

In (A) of FIG. 8, the resistive element R2 constitutes a discharge current path of the capacitor C and generates a voltage to be applied between the gate and the source of the MOS-FET. The configuration other than the switch element of (A) and (B) of FIG. 8 corresponds to those of (A) and (B) of FIG. 7.

A MOS-FET may be used for the switch element 31 as described above.

FIG. 9 is diagrams of which (A), (B) and (C) illustrate examples of several connection positions of the diode D2 between the power generation unit 1 and the wireless transmission unit 2. A connection point of the diode D2 is not limited to that illustrated in FIG. 6. The diode D2 may be inserted at a position at which, when the power generation unit 1 generates a voltage of the second polarity, a power supply voltage of the opposite polarity is not applied to the wireless transmission unit 2 as illustrated in (A), (B), and (C) of FIG. 9.

FIG. 10 is diagrams of which (A) and (B) illustrate examples in which a switch element different in type from the switch element 31 illustrated in FIG. 6, (A) and (B) of FIG. 8 is used. (A) of FIG. 10 illustrates an example in which a PNP-type bipolar transistor is used as a switch element 31. (B) of FIG. 10 illustrates an example in which a P-channel MOS-FET is used as a switch element 31. In (B) of FIG. 10, the resistive element R2 constitutes a discharge current path of the capacitor C and generates a voltage to be applied between the gate and the source of the MOS-FET.

An operation of the circuit illustrated in (A) of FIG. 10 is as follows.

(a) When the power generation unit 1 generates a voltage of the first polarity due to an initial operation of the operation unit 10, the switch element 31 does not conduct electricity and the voltage of the first polarity is supplied to the wireless transmission unit 2.

(b) Then, when the power generation unit 1 generates a voltage of the second polarity due to return of the operation unit 10, a current (a return-time current) flows in the series circuit of the diode D1 and the capacitor C in the direction from the power generation unit 1 and the voltage supply line 30L to the voltage supply line 30H. Due to this current, the capacitor C is charged with a negative polarity on the anode side of the diode D1 and a positive polarity on the voltage supply line 30L side.

(c) Then, when the power generation unit 1 generates a voltage of the first polarity due to recoil of the operation unit 10, a switch element control current flows through the path of the power generation unit 1→the voltage supply line 30H→the emitter and the base of the transistor→the capacitor C→the voltage supply line 30L→the power generation unit 1. Since the current flows, the capacitor C is discharged.

The current is a control signal for the switch element 31. Thus, the switch element 31 conducts electricity, and the path between the voltage supply lines 30H and 30L is shunted. Due to the above configuration, a power supply voltage to the wireless transmission unit 2 becomes substantially 0 V.

(d) Then, when the power generation unit 1 generates a voltage of the second polarity due to return from the recoil of the operation unit 10, the same operation as (b) described above is performed.

(e) Then, when the power generation unit 1 generates a voltage of the first polarity due to the recoil of the operation unit 10 again, the same operation as (c) described above is performed.

Although the operation of the circuit illustrated in (B) of FIG. 10 is basically similar to the case of (A) of FIG. 10, a switch element control current flows through the path of the power generation unit 1→ the voltage supply line 30H→ the resistive element R2→ the capacitor C→ the voltage supply line 30L→ the power generation unit 1 in the above-described (c).

Finally, it is a matter of course that the description of the above-described embodiment is merely exemplary and is not limitative. The invention can be appropriately modified and changed by a person skilled in the related art.

Although the examples illustrated in FIG. 1, (A) and (B) of FIG. 2, and the like, for example, have introduced the switch for wirelessly transmitting a signal indicating an operation of an operator due to the operation, the invention can also be similarly applied to a limit switch, or the like that causes telegraphing when the switch is operated due to contact of a dog for the limit switch.

In addition, the diode D1 illustrated in FIG. 6, for example, may be an LED. In this case, since the diode D1 (LED) emits light when a return-time current flows thereto, the LED can also serve as an indicator indicating that an operation of the operation unit has been performed.

What is claimed is:

1. A wireless switch comprising:
    a movable section provided to be freely displaceable;
    an operation unit elastically held by the movable section and, when in a non-neutral state, vibrating due to an action of an elastic force that causes return to a neutral state and displacing the movable section in a direction corresponding to a direction of a vibration;
    a power generation unit generating a voltage of a polarity corresponding to a direction of displacement when the movable section has been displaced;
    a wireless transmission unit wirelessly transmitting a signal based on a power generated by the power generation unit; and
    a voltage supply control circuit, when the operation unit in the neutral state has been operated such that the operation unit is brought into the non-neutral state, supplying a voltage to the wireless transmission unit using the power generated by the power generation unit at a time of an initial state change of the operation unit and then disabling a voltage supply to the wireless transmission unit by the power generated by the power generation unit accompanying the vibration of the operation unit caused by the action of the elastic force afterward.

2. The wireless switch according to claim 1, wherein the voltage supply control circuit comprises
    voltage supply lines for supplying the voltage from the power generation unit to the wireless transmission unit;

a switch element shunt-connected to the voltage supply lines and blocking the voltage supply to the wireless transmission unit using conduction; and a switch element control circuit charged with a voltage of a polarity opposite to the polarity of the voltage generated by the power generation unit and to be supplied to the wireless transmission unit and causing the switch element to conduct electricity.

3. The wireless switch according to claim 2, wherein the switch element control circuit is a circuit which is connected between the voltage supply lines with a diode that prevents backflow of the voltage of the polarity to be supplied to the wireless transmission unit and a capacitor connected in series and in which a voltage at a connection point of the diode and the capacitor is output to the switch element as a control signal.

* * * * *